United States Patent Office 3,455,645
Patented July 15, 1969

3,455,645
PROCESS FOR PREPARING AMORPHOUS
GERMANIUM DIOXIDE
Gerardus H. Kroes, Arnhem, Netherlands, assignor to American Enka Corporation, Enka, N.C., a corporation of Delaware
No Drawing. Filed Aug. 19, 1966, Ser. No. 573,449
Claims priority, application Netherlands, Aug. 28, 1965, 6511264
Int. Cl. C01g 17/02
U.S. Cl. 23—22                                    5 Claims

ABSTRACT OF THE DISCLOSURE

The process of preparing amorphous germanium dioxide wherein a germanium compound is hydrolyzed in an aqueous medium maintained at a pH which does not drop locally to below 5 and the final pH is lower than 9 followed by separating the amorphous germanium dioxide precipitate from the hydrolyzing aqueous medium. A preferred aqueous medium is an aqueous solution of sodium hydroxide.

---

This invention relates to a new process for the production of amorphous germanium dioxide which recently has found important utility as a catalyst in producing polyethylene terephthalate.

Polyethylene terephthalate is a high molecular weight linear polyester having great commercial value as a filament, fiber and film-forming material. The polymer is made by polycondensing a monomeric derivative of terephthalic acid which, under the influence of heat, reduced pressure and in the presence of suitable catalysts is capable of being polycondensed.

The most common commercial production of fiber-forming macromolecular polyethylene terephthalate utilizes an ester interchange reaction in which a glycol is reacted with a dimethyl ester of terephthalic acid—although it can also be satisfactorily produced by the direct esterification of a glycol with terephthalic acid. While producers prefer the ester interchange route since terephthalic acid is rather an intractable substance and is particularly difficult to purify to the high standards necessary to obtain efficient polymerization, either route mainly produces the so-called monomer, bis-hydroxyalkyl terephthalate. The monomer can then be subsequently condensed to give a highly polymeric linear polyester product.

To facilitate carrying out polymerization (polycondensation) in a reasonable time to render the process commercially feasible, it is necessary to use a catalyst to increase the speed of reaction and numerous compounds have been discovered over the years which are suitable. Disadvantages however have been found in many and some of the more pronounced are: slow speed of polymerization, low degree of polymerization as well as the catalyst causing undesirable degradation reactions leading to a product having poor color and filament, fiber and film-forming qualities.

Among the many compounds described in the prior art as being suitable for polycondensation catalysts in manufacture of high polymeric polyethylene terephthalate are metallic germanium and crystalline germanium dioxide. Crystalline germanium dioxide is claimed in U.S. Patent No. 2,578,660; it has not been found entirely satisfactory for large-scale production processes because of its insolubility, slow reaction and tendency to cause polymer haziness.

French Patent No. 1,321,000 attempts to improve the reaction rate of the bis-hydroxyalkyl terephthalate monomer by including a small amount of an organic titanium compound therewith when it is added during polycondensation. Solubility allegedly has been improved using lower molecular weight alkoxides of germanium. The process of using this compound is claimed in U.S. Patent No. 3,074,913.

More recently, U.S. application Ser. No. 434,090, filed Feb. 19, 1965 and commonly assigned herewith teaches that the amorphous form of germanium dioxide is readily miscible with bis-hyroxyalkyl terephthalate and a rapid rate of polycondensation is obtained even when added during the ester interchange step. Quite to the contrary of known crystalline allotropic forms of germanium dioxide, as well as other known derivatives of germanium, it has been found the amorphous form is more soluble in reactants being polycondensed and with no sacrifice whatsoever in the color or the viscosity the polymer obtained. Moreover, the amorphous form has been found to produce a polymer in much less time yet while permitting use of a considerably smaller amount when compared to crystalline germanium dioxide.

Amorphous germanium dioxide heretofore could only be prepared from crystalline germanium dioxide by melting the crystalline form and quickly cooling the melt obtained. While the glass-like melt obtained results in a relatively pure form of amorphous germanium dioxide, it is a very difficult process to utilize commercially particularly since the melting must take place at a temperature above 1150° C. At such an extremely high temperature, molten germanium dioxide is a highly aggressive compound. For example, melt formation heretofore could only be carried out using platinum crucibles which had to be replaced after a use of one or two times.

Another important drawback which adds to the cost of this heretofore only known method of producing amorphous germanium dioxide is the fact that the glass-like amorphous product must be further comminuted to the required particle size in order to permit its use for the catalytic purposes intended.

It is therefore an object of this invention to produce amorphous germanium dioxide without the necessity of melt formation and subsequent grinding of the product to obtain a size necessary to permit its use as a polycondensation catalyst in making polyethylene terephthalate.

It is a further object of the invention to produce amorphous germanium dioxide in commercial quantity and in a state pure enough to permit its use in polycondensation of bis-hydroxyalkyl terephthalate.

According to the invention amorphous germanium dioxide is formed by an advantageous improvement of the known method of preparing germanium dioxide by hydrolyzing a germanium compound in an aqueous medium and separating the precipitate formed from the liquid. The improvement according to the invention comprises carrying out the hydrolysis in a medium the pH of which does not drop locally to below 5 whereas the final pH is lower than 9 and separating the precipitate consisting of germanium dioxide in the amorphous state. In obtaining the catalyst in relatively pure form, it is preferred that germanium tetrachloride, an intermediate formed in known processes of purifying germanium, be added directly to an aqueous medium under the conditions discussed before.

The precipitating medium consists of an aqueous solution of ammonium hydroxide, hydroxides of sodium, potassium, and lithium although an aqueous solution of a salt of a strong base and a weak acid can be used as can various known organic bases. For reasons of economy, however, it is preferred that sodium hydroxide be used.

To prevent hexagonal or tetragonal crystal formation in the resulting oxide, the pH should not be allowed to drop below 5, and it is preferred that it be maintained above 6. Conversely, the final pH of the mixture consisting of the oxide in the precipitating medium should not be greater than 9 in order to avoid formation of germanium salts, for example $M_2GeO_3$ in which M is cation present in the basic substance used. Accordingly, it is preferred that the final pH be below 8.

An altrenative method of carrying out the process according to the invention consists in starting with a commercially available hexagonal or tetragonal crystalline form of germanium dioxide.

Crystalline germanium dioxide is first converted into a water soluble germanate for instance by boiling in an aqueous solution containing for instance 10 g. of sodium-hydroxide per 90 g. of water. To obtain amorphous germanium dioxide this strongly alkaline solution is adjusted to a pH in the range of from 5–9 by the addition of acid seeing to it that the pH nowhere drops below 5.

In choosing either route, the product obtained is shown by conventional X-ray diffraction methods to be a pure germanium dioxide in an amorphous form. This amorphous form of germanium dioxide makes it possible to produce polyethylene terephthalate in a given time while utilizing a considerably smaller amount of catalysts than that necessary when use is made of crystalline germanium dioxide and even when including antimony trioxide.

Although the exact nature of the reaction in which the amorphous form of germanium dioxide creates is not known, the catalyst surprisingly increases the reaction rate, and provides a polymer product having excellent spinnability into fibers and filaments having an exceptional clarity of color. Because of this increased reaction rate during the polycondensation step, additional organic titanium compounds are no longer necessary and the inherent discolorations normally characteristic of their use are avoided.

The novel catalyst may be added to the reaction mixture at any point prior to the polycondensation step and including before or during ester interchange. It may be added either together with the ester interchange catalyst prior to formation of the low molecular weight diglycol terephthalate or it may be added separately after such formation. Similarly, in direct esterification methods, the novel catalyst may be initially added with the glycol and acid or at any convenient point during the polycondensation phase in polymer formation.

Additional compounds may be added to the ester interchanging and polycondensation mixture at any stage of the process without deleteriously affecting the invention. An example of the compounds with which the catalyst according to the invention might be used would be those which render the ester interchange catalyst ineffective after the interchange reaction, those which affect the dye affinity of the polymer, or those which influence the melt viscosity of the polymer as well as certain delusterants commonly used in polyester fiber and filament production.

For better understanding of the invention the following examples are given by way of illustration and not limitation. All parts are by weight unless otherwise noted.

Example I

Germanium tetrachloride was slowly added to a vigorously stirred solution of 10 parts by weight of sodium hydroxide in 90 parts by weight of water. The pH of the liquid was continuously measured and when it had reached a value of 8, addition of the germanium tetrachloride was stopped. The precipitate formed was filtered off, washed with water (pH 8), and dried.

The white powder thus obtained consisted of pure germanium dioxide, which, upon conventional X-ray examining techniques, proved to be completely amorphous and not to contain crystalline structure whatsoever.

To demonstrate its utility in forming polyethylene terephthalate, the powder was found to completely dissolve in warm ethylene glycol.

Example II

The process described in Example I was repeated, except that germanium tetrachloride was added to the solution until the pH reached a value of 6. The product obtained had the same properties as that obtained according to Example I.

More germanium tetrachloride was added to show the effect of the hydrogen ion concentration.

The pH was dropped to a value of 4, and the product obtained proved, upon X-ray examination, to consist of primarily hexagonal crystals. Moreover, it was no longer completely soluble, even in boiling ethylene glycol.

Example III 12.5 parts by weight of hexagonal germanium dioxide were dissolved, with stirring and heating to 100° C., in 87.5 parts by weight of a 10% by weight aqueous solution of sodium hydroxide.

The solution was allowed to cool to 20° C. whereupon dilute hydrochloric acid was slowly added dropwise and with stirring until the pH reached a value of 6. The precipitate subsequently was centrifuged off, washed with water (pH=7), and dried in vacuo at 45° C.

The powder obtained consisted of completely amorphous germanium dioxide and it immediately dissolved when added to warm ethylene glycol.

Example IV

Again to prove the effect of pH control, more hydrochloric acid was added dropwise to the composition disclosed in Example III. The pH of the mixture was allowed to drop to a value of 4. A powder was obtained and consisted of primarily hexagonal germanium dioxide. This form remained insoluble in ethylene glycol, even when subjected to prolonged boiling.

What I claim is:

1. In the process of preparing germanium dioxide by hydrolyzing a germanium compound in an aqueous medium and separating the precipitate formed from the liquid, the improvement of carrying out the hydrolysis in a medium the pH of which does not drop locally to below 5 whereas the final pH is lower than 9 and separating the precipitate consisting of germanium dioxide in the amorphous state.

2. A process according to claim 1, wherein the germanium compound is germanium tetrachloride.

3. A process according to claim 1, wherein the germanium compound is a water soluble germanate.

4. A process of claim 1, wherein the pH of the medium does not drop locally to below 6 whereas the final pH is lower than 8.

5. A process according to claim 1 wherein the aqueous medium is an aqueous solution of sodium hydroxide.

References Cited

Johnson: Chemical Reviews, vol. 51, 1952, pp. 431–434 and 443–447.

Lippincott et al.: Journal Research of National Bureau of Standards, vol. 61, July 1958, pp. 61–70.

Mellor: A Comprehensive Treatise on Theoretical and Inorganic Chemistry, vol. 7, 1927, pp. 265–267.

Nelson et al.: Developments in Applied Spectroscopy, vol. 2, 1963, pp. 308–321.

HERBERT T. CARTER, Primary Examiner

U.S. Cl. X.R.

23—23, 24, 140; 260—75